US009628675B2

(12) United States Patent
Zhou et al.

(10) Patent No.: US 9,628,675 B2
(45) Date of Patent: Apr. 18, 2017

(54) METHOD AND APPARATUS FOR OBJECT TRACKING AND RECOGNITION

(75) Inventors: Wei Zhou, Beijing (CN); Jun Li, Cranberry, NJ (US); Xiao Jun Ma, Beijing (CN)

(73) Assignee: Thomson Licensing (FR)

( * ) Notice: Subject to any disclaimer, the term of this patent is extended or adjusted under 35 U.S.C. 154(b) by 284 days.

(21) Appl. No.: 13/808,032

(22) PCT Filed: Jul. 2, 2010

(86) PCT No.: PCT/CN2010/001000
§ 371 (c)(1),
(2), (4) Date: Jan. 2, 2013

(87) PCT Pub. No.: WO2012/000138
PCT Pub. Date: Jan. 5, 2012

(65) Prior Publication Data
US 2013/0107057 A1    May 2, 2013

(51) Int. Cl.
*H04N 5/225*    (2006.01)
*H04N 5/44*     (2011.01)
*G08B 13/196*   (2006.01)
*G08B 13/24*    (2006.01)

(52) U.S. Cl.
CPC .......... *H04N 5/225* (2013.01); *H04N 5/4403* (2013.01); *G08B 13/19697* (2013.01); *G08B 13/248* (2013.01); *H04N 2005/4428* (2013.01)

(58) Field of Classification Search
CPC .................................. B25J 5/007; H04N 5/76
See application file for complete search history.

(56) References Cited

U.S. PATENT DOCUMENTS

| 8,228,383 B2 * | 7/2012 | Sugiura ................. G06F 3/0488 348/169 |
| 2004/0105006 A1 * | 6/2004 | Lazo ................... G07C 9/00111 348/169 |
| 2004/0164858 A1 * | 8/2004 | Lin ................... G08B 13/19608 340/522 |

(Continued)

FOREIGN PATENT DOCUMENTS

| CN | 1460369 | 12/2003 |
| CN | 1900856 | 1/2007 |

(Continued)

OTHER PUBLICATIONS

Search Rept:Apr. 7, 2011.

(Continued)

*Primary Examiner* — William C Vaughn, Jr.
*Assistant Examiner* — Jerry Jean Baptiste
(74) *Attorney, Agent, or Firm* — Jack Schwartz & Associates, PLLC (57) ABSTRACT

An object tracking and recognition system are provided and comprise a video device for getting the image information of an object in the detection range of the object tracking and recognition system; and a radio frequency identification (RFID) device for detecting signal strength of a radio frequency (RF) tag of the object; wherein the video device is turned on to get the image information of the object upon the detected signal strength reaching a predetermined signal strength threshold.

8 Claims, 5 Drawing Sheets

(56) References Cited

U.S. PATENT DOCUMENTS

2007/0192910 A1* 8/2007 Vu .......................... B25J 5/007
  700/245
2009/0322537 A1  12/2009 Tapp et al.
2010/0085193 A1*  4/2010 Boss et al. ................ 340/573.1

FOREIGN PATENT DOCUMENTS

| CN | 101131432 | 2/2008 |
|---|---|---|
| CN | 101191833 | 6/2008 |
| CN | 101673094 | 3/2010 |
| JP | 6363897 | 4/1988 |
| JP | 2002250768 | 9/2002 |
| JP | 2004289208 | 10/2004 |
| JP | 2005123932 | 5/2005 |
| JP | 2005286493 | 10/2005 |
| JP | 200660471 | 3/2006 |
| JP | 2006127355 | 5/2006 |
| JP | 2007074657 | 3/2007 |
| JP | 2008205548 | 9/2008 |
| JP | 2008281239 | 11/2008 |
| WO | WO0199410 | 12/2001 |

OTHER PUBLICATIONS

Yihua Huang et al., "An Improved Bayesian-based RFID Indoor Location Algorithm" Chinese Journal of Electronics, vol. 18, No. 3, Jul. 2009.

Kai-Jie Yang et al. "Location Tracking in Mobile Networks under Correlated Shadowing Effects", 978-1-4244, IEEE Communications Society, WCNC 2009 Proceedings.

Abdelmoula Bekkali et al., RFID Indoor Tracking based on Inter-tags Distance Measurement: 1-4244-0697-8, 2007 IEEE.

* cited by examiner

|     | DR1 | DR2 | DR3 | R7 | R8 | R9 | R4 | R5 | R6 |
| --- | --- | --- | --- | --- | --- | --- | --- | --- | --- |
| DR1 | $(\omega^0_{1,1}, \omega^1_{1,1})$ | $(\omega^0_{1,2}, \omega^1_{1,2})$ | $(\omega^0_{1,3}, \omega^1_{1,3})$ | $(\omega^0_{1,4}, \omega^1_{1,4})$ | $(\omega^0_{1,5}, \omega^1_{1,5})$ | $(\omega^0_{1,6}, \omega^1_{1,6})$ | ... | $(\omega^0_{1,8}, \omega^1_{1,8})$ | ... |
| DR2 | ... | ... | ... | ... | ... | ... | ... | ... | ... |
| DR3 | ... | ... | ... | ... | ... | ... | ... | ... | ... |
| R7  | ... | ... | ... | ... | ... | ... | ... | ... | ... |
| R8  | ... | ... | ... | ... | ... | ... | ... | ... | ... |
| R9  | ... | ... | ... | ... | ... | ... | ... | ... | ... |
| R4  | ... | ... | ... | ... | ... | ... | ... | ... | ... |
| R5  | ... | ... | ... | ... | ... | ... | ... | ... | ... |
| R6  | ... | ... | ... | ... | ... | ... | ... | ... | ... |

METHOD AND APPARATUS FOR OBJECT TRACKING AND RECOGNITION

This application claims the benefit, under 35U.S.C. §365 of International Application PCT/CN2010/001000, filed Jul. 2, 2010, which was published in accordance with PCT Article 21(2) on Jan. 5, 2012 in English.

FIELD OF THE INVENTION

This invention relates generally to object tracking and recognition system, and in particular, to a method and apparatus for object tracking and recognition including both RFID and video devices.

BACKGROUND

The idea of ubiquitous computing is helpful to let people who benefit from the computer or other electronic devices see no device as they use it. People's natural activities can drive the applications executed as needed without explicit commands.

The first task to build a ubiquitous computing platform is to carry out an object tracking and recognition to acquire the activity status of a user. For example, in a digital home environment, the activity status can be any information on location, motion, gestures, voice, or face expression of the user. With the detection and analysis on user's activity status, the system can take corresponding actions without explicit operations on home devices.

A simple application scenario can be described as follows: 1) A TV set for example is in off status regardless of a user moving in and out the living room where the TV set is placed. 2) Once the user shows intention to watch the TV for example by sitting on the coach or standing still in front of the TV, the TV flashes (like blinking its eyes). 3) When the user waives to the TV with his hand a couple of times, the TV turns on. 4) The user can continue to operate the TV with his hand gestures or voice command. 5) When the user moves out of living room, the TV program is paused; and when the user moves back, the TV program is resumed.

Traditionally, Radio frequency identification (RFID) location determining system is used for user location detection. However it is still difficult to have the location detection because the obtained power strength is not always stable in a multipath indoor environment. In addition, video camera for tracking objects is common in the art. The image information of the object, such as location including the "real world" coordinates of the object, the "physical" location of the object, the "3D" coordinates of the object, the motion, the gesture and so on, is determined from the appearance of the object in the field of view of one or more cameras.

One simple hybrid location detection and object recognition method is as follows: each home user wears an active RFID tag transmitting radio signals to receivers inside home. A simple setup is to locate one RFID receiver on top of the electronic device to be controlled, such as TV. The tag can be attached on user's shoes or clothing. In addition, multiple video devices such as camera, video tracking device, are also arranged on the top of TV or at a specific place in the room.

SUMMARY OF THE INVENTION

The invention concerns a object tracking and recognition system comprising: a video device for getting image information of an object in detection range of the object tracking and recognition system; and RFID device for detecting signal strength of a RF tag of the object; Wherein the video device is turned on to get the image information of the object upon the detected signal strength reaching a predetermined signal strength threshold.

The invention also concerns a method used in an object tracking and recognition system comprising: getting, by a video device, image information of an object in detection range of the object tracking and recognition system; and detecting, by a RFID device, signal strength of a RF tag of the object; Wherein turning on the video device to get the image information of the object based on the detected signal strength when reaching a predetermined signal strength threshold.

BRIEF DESCRIPTION OF THE DRAWINGS

Exemplary embodiments of the invention are described with reference to the accompanying drawings, which show in FIG. 1 illustrates a hybrid object tracking and recognition system in accordance with an embodiment of the invention.

DETAILED DESCRIPTION OF THE INVENTION

Figure 1:
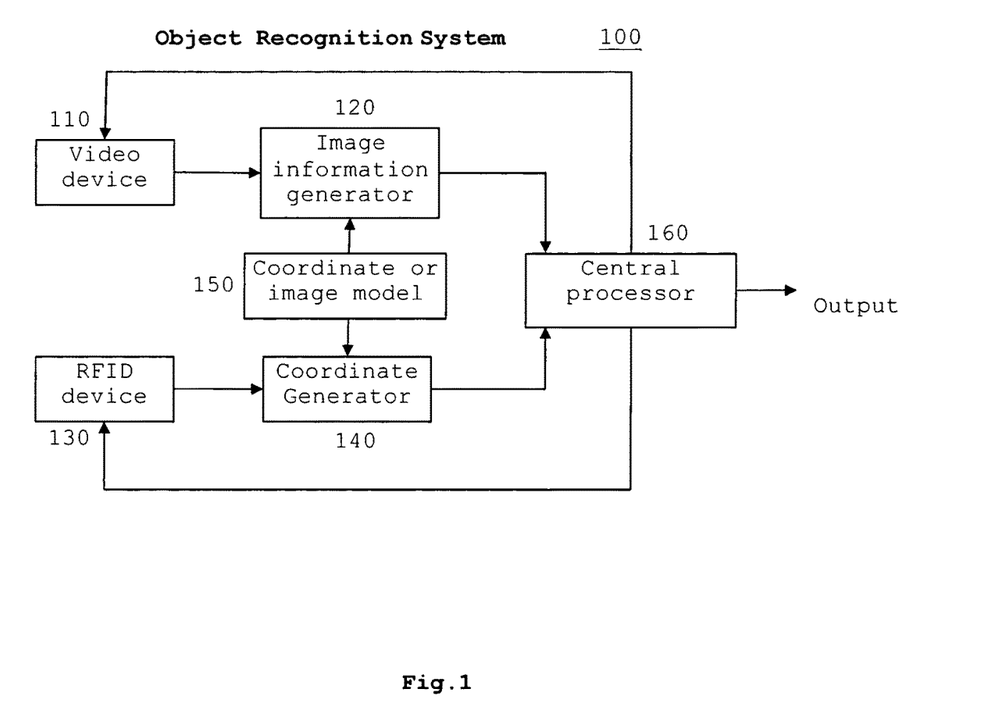

FIG. 1 illustrates a hybrid object tracking and recognition system 100 in accordance with an embodiment of the invention. The system 100 includes a video device 110, which can be one or more cameras arranged on an electronic device such as a display device, a TV, for getting the object or user image information that appears in the video scenes. The video device 110 is coupled to, or includes, an image information generator 120 that maps the location of the objects in the video scenes to coordinates in front of the display device, or gets the image information such as motion, gestures, voice or expression. The coordinates may be true coordinates, such as latitude, longitude, and altitude. Or they may be coordinates relative to a particular area, or relative to an artificial field of reference, and so on. The coordinates are used to identify where the object is actually located in the detection range of the system 100, and to show the distance from the object to the display device. Typically the coordinates and other image information can be obtained based on a coordinate and image model 150, which may include a floor plan model or a global model with latitude and longitude lines, and image database. The technology of using the video device 110 and the image information generator 120 to get the coordinates or other image information of object is known to one skilled in the art, and the details thereof will be omitted here.

The system 100 also includes a RFID device 130, which includes one or more RFID receivers arranged on the display device, for detecting the signal strength of RFID tags (not shown) attached on the objects or users and emitting RF energy. The RFID device 130 is coupled to, or includes a coordinate generator 140 to get the location of the objects based on the coordinate and image model 150, and detect the distance from the user to the display device. The technology of using the RFID device 130 and the coordinate generator 140 to get the coordinates and distance of object is known to one skilled in the art, and the details thereof will be omitted here.

It is known that the video device can get more accurate image information of the object than the RFID device. However, considering the user's privacy and the energy consumption, it is better to turn on the video device only when it is necessary, especially when the camera used as the video device is a wireless one. Therefore, according to the embodiment of the invention, a central processor 160 is used to control the video device 110 and the RFID device 130 so that when RF signal strength is greater than a predetermined threshold, it indicates the object or the user is close to a display device, such as TV, the video device powers on; when object or user is far from TV, RF signal strength is low, video device cut off.

The predetermined threshold is the signal strength when the object is located in a specific place or has a specific distance (such as 6 meters) from the display device. The threshold can represent the environment when it is generated. If environment changes, the threshold may be invalid, and in that case the specific place or the distance will be error.

Figure 2:
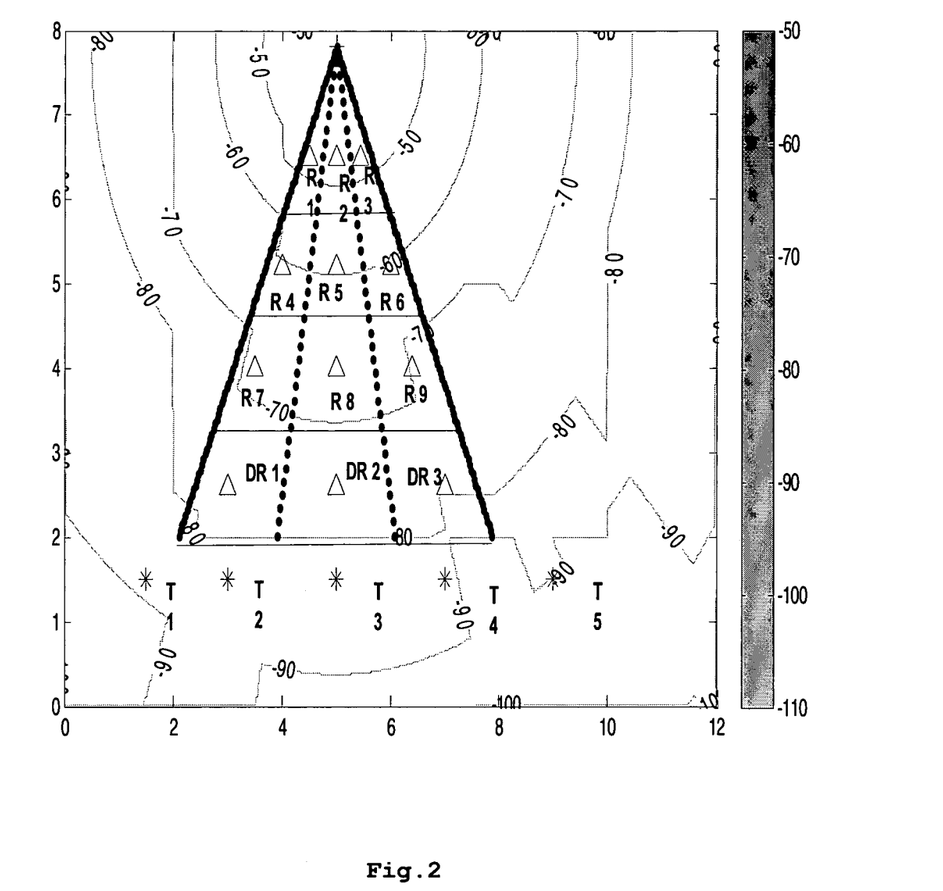
FIG. 2 is a diagram showing the RF signal strength distribution according to the embodiment of the invention.

According to the embodiment of the invention, a relationship model is built to describe the signal strength relation between two points in the detection range of the system 100, so as to estimate and dynamically update the signal strength of the threshold using the two points. FIG. 2 is a diagram showing the RF signal strength distribution according to the embodiment of the invention. The corresponding RSS contour lines are shown. In this figure, the bar at the right side represents the Radio Signal Strength RSS (dB), the x axis and y axis define the coordinate of the detection range of the object recognition system 100, which here is based on the camera used in the system. The camera has a certain field-of-view (FoV) and Depth-of View (DoV) which are angle and the distance respectively where the camera sensor can capture an accurate image/video. In the figure, the detection range can be divided into several grids (such as, R1-R9 and DR1-DR3), wherein DR1-DR3 are the threshold grids, and the corresponding signal strength therein are the predetermined threshold to power on the display device. The position of each grid can be represented by its center point, which means the Radio signal strength of each grid can be represented by Radio signal strength at its center point.

It is known that the signal strength relationship between two grids among these grids (R1-R9 and DR1-DR3) can be modeled by the following linear model:

$$r_i = \omega_{i,j}^0 + \omega_{i,j}^1 r_j \quad (1)$$

Wherein $r_i$ represents received signal strength sample at the $i^{th}$ grid, $r_j$ represents received signal strength sample at the $j^{th}$ grid, $\omega_{i,j}^0$ and $\omega_{i,j}^1$ are the coefficient of linear model. For example, these coefficients can be obtained by multiple samples at the $i^{th}$ grid and $j^{th}$ grid collected from offline training, and applying Minimum mean-square error (MMSE) to these samples to get these coefficients.

In addition, it is known that the linear relationship is stable or fixed, that is, normally the relationship cannot be influenced by the environment change. So a linear model matrix (assumed it is composed of M*M elements) is used to describe the relationship between M grids in the detection range, wherein the element (in the $i^{th}$ row and the $j^{th}$ column) is the coefficients ($\omega_{i,j}^0$, $\omega_{i,j}^1$) which represent the RSS relationship between $i^{th}$ and $j^{th}$ grid. And this linear model matrix can be used in online phase to help to estimate the signal strength in detection range, such as the RSS value in the threshold ranges DR1, DR2, and DR3 in FIG. 2. In addition, the present invention is not limited to the linear model obtained from two grids, and it is apparent for one skilled in the art to get the linear model for more than two grids according to the embodiment of the invention. The present invention is also not limited to the linear model matrix, and one skilled in the art can use other stable relationship model between the grids to embodiment the invention.

Figure 3:
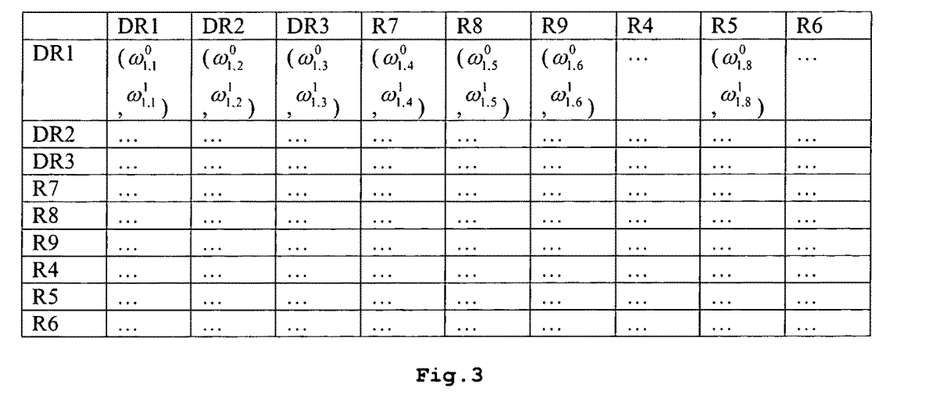
FIG. 3 is an illustrative table showing a linear matrix model according to the embodiment of the invention.

One example of the linear model matrix is shown in FIG. 3. In the figure, the element for each two grids is shown. It shall be noted that the element for the same grid, such as DR1 and DR1, R7 and R7 is not used in the embodiment.

Figure 4:
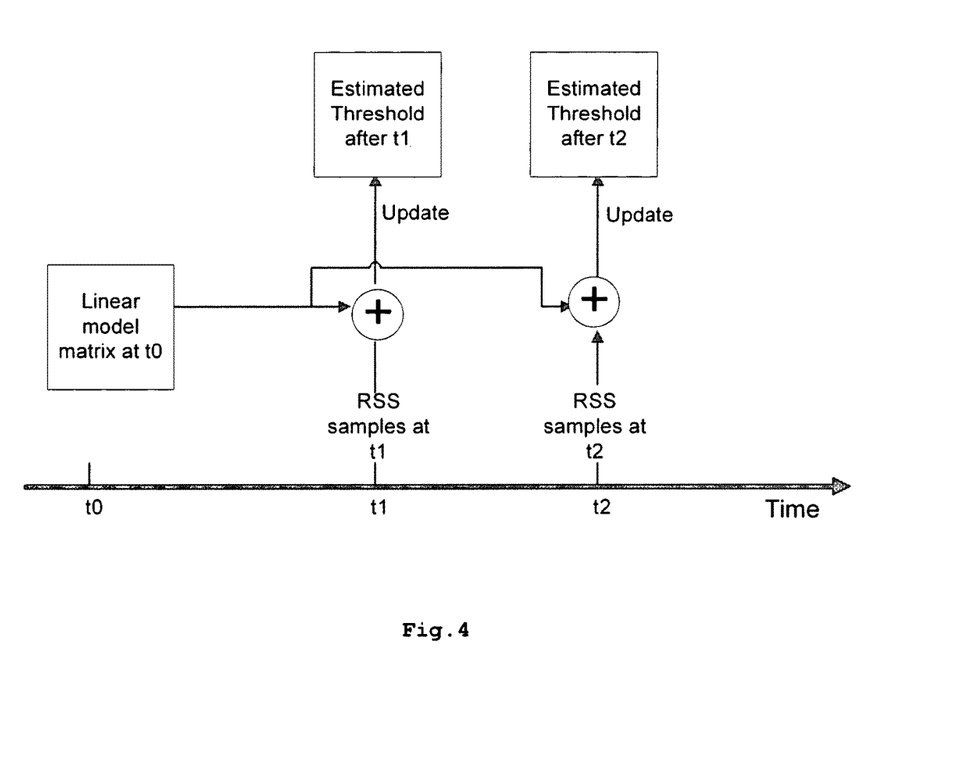
FIG. 4 is a diagram showing a method of using the linear matrix model according to the embodiment of the invention.

FIG. 4 is a diagram showing a method of using the linear model matrix. According to the embodiment of the invention, the linear model matrix is used to dynamically update the predetermined signal strength threshold at DR1-DR3. For example, at t0, the linear model matrix is obtained by offline training. If an object occurs in grids (For example R7) of the detection range at t1, the camera will be turned on since the signal strength of the RF tag attached on the object is greater than the original threshold. At this time, both the camera and the RF receiver are available. So the distance from the display device and the grid where the object occurred will be obtained by the camera, and the current signal strength of the attached tag has also been obtained. According to these sample data, the signal strength at the threshold grid such as DR1 can be obtained based on the linear model matrix ($\omega_{1,4}^0$, $\omega_{1,4}^1$) and the equation (1). This method is called single point estimation. Based on the same method, the estimated threshold at t1 and t2 can be updated to power on the display device next time when the object moving into the detection area.

In addition, multiple point estimation method based on the linear model matrix can also be used. When there are a plurality of signal strength samples captured by image analysis of the camera in online phase, the multiple point estimation can be used. That means the threshold is estimated by multiple RSS samples at multiple points. For example, it is assumed that threshold ($r_i$) corresponding to DR1 will be estimated and the signal strength samples at R4, R5, R7, R8 have been captured by image analysis. The two grids (R7,R8) which are the two nearest grids to DR1, will be chose for the estimation. And then respective linear model will be independently used to estimate the signal strength of DR1. These two estimation results will be combined by one maximal ratio combination algorithm. The detail is as follows:

Choose the two nearest grids (R7,R8), $r_j$, $r_k$ representing the signal strength sample of R7, R8 respectively. In order to select a more accurate grid to get the estimation value, a confidence of each grid, $C_{1,i}$ of $r_j$ and $C_{2,i}$ of $r_k$ can be introduced as follow:

Find the adjacent grid R4 ($r_l$ is its signal strength) of the grid R7, and estimate $r_j$ by $r_l$ using equation (1). Then get the confidence of R7 by equation (2):

$$C_{1,i} = 1/(r_j - (\omega_{j,l}^0 + \omega_{j,l}^1 r_l))^2 \quad (2)$$

wherein $r_j$ is the detected signal strength at R7, and $\omega_{j,l}^0 + \omega_{j,l}^1 r_l$ is the estimated signal strength at R7 by using $r_l$ and the linear model matrix in FIG. 3. From equation (2), we can see that higher $C_{1,i}$ can represent higher confidence of the sample at this grid.

Then find the nearest grid R5 ($r_m$ is its signal strength) of the point R8, and estimate $r_k$ by $r_m$ using equation (1). Then get the confidence of R8 by equation (4):

$$C_{2,i}=1/(r_k-(\omega_{k,m}^0+\omega_{k,m}^1 r_m))^2 \quad (3)$$

Normalize $C_{1,i}$ and $C_{2,i}$ using the following equations:

$$C_{1,i}=C_{1,i}/(C_{1,i}+C_{2,i}) \quad (4)$$

$$C_{2,i}=C_{2,i}/(C_{1,i}+C_{2,i}) \quad (5)$$

Combine the estimations of the threshold $r_i$ with maximal ratio combining (MRC) method using the following equations: estimate the threshold $r_i$ (expressed as $r_{1,i}$ in the equation) using the $r_j$ $$r_{1,i}=\omega_{i,j}^0+\omega_{i,j}^1 r_j \quad (6)$$

Estimate $r_i$ (expressed as $r_{2,i}$ in the equation) using the $r_k$.

$$r_{2,i}=\omega_{i,k}^0+\omega_{i,k}^1 r_k \quad (7)$$

Obtain the final estimation of $r_i$ by MRC method:

$$r_i=C_{1,i}r_{1,i}+C_{2,i}r_{2,i} \quad (8)$$

Figure 5:
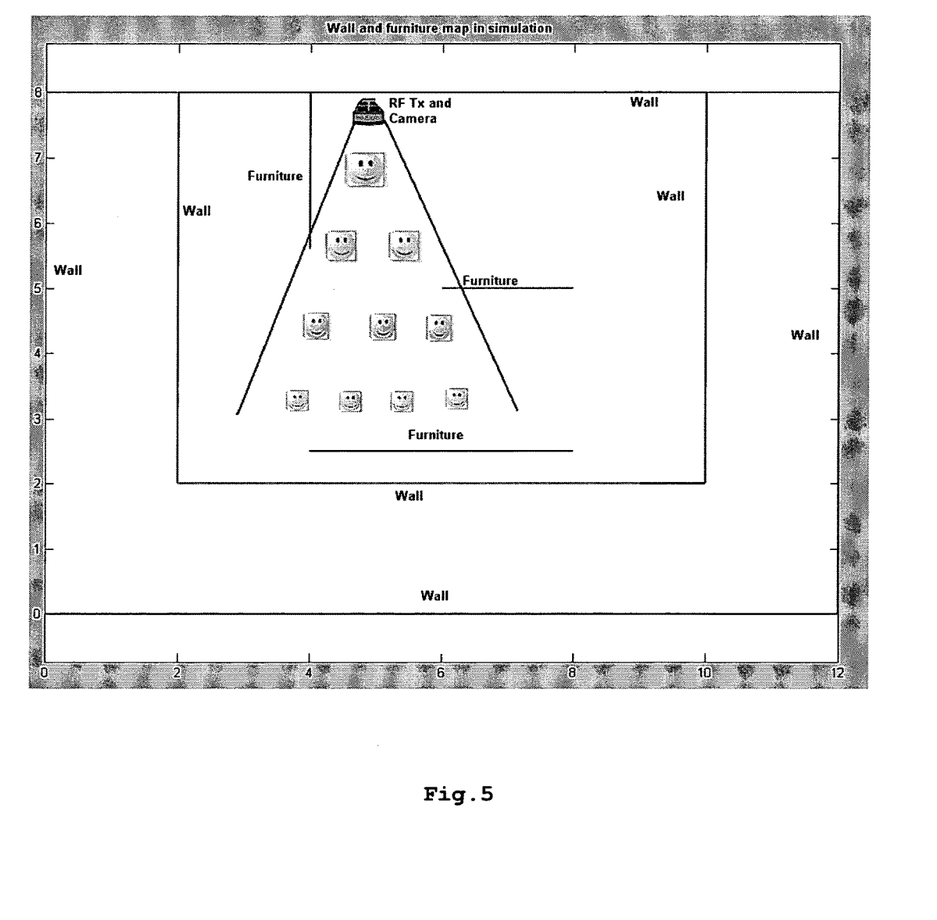
FIG. 5 is a diagram showing the detection range of the video device according to the embodiment of the invention.

The threshold is updated using the obtained $r_i$ so that the camera can power on when an object moving into the threshold grids to capture the status information of the object. FIG. 5 is a diagram showing the detection range of the video device according to the embodiment of the invention. In FIG. 5, the outline of walls and furniture distribution in the room is shown. In the detection range between two border lines, the relation between user's feature size (such as face size) and distance between camera and user are also shown. For example, the snapshot sequence images based on adult face size/child face size are prepared in a memory of the image information generator 120, so that a rough distance from-the display device to the user can be defined based on the comparison of new snapshot picture with these sample snapshot images. In fact, the RFID tag which includes the user identification information can help to choose which type of face will be used to make comparison. For example, user face feature can be stored in the RFID tag. At the same time, the user direction information can also be captured with the analysis of where face is in camera image (left/right/middle).

Figure 6:
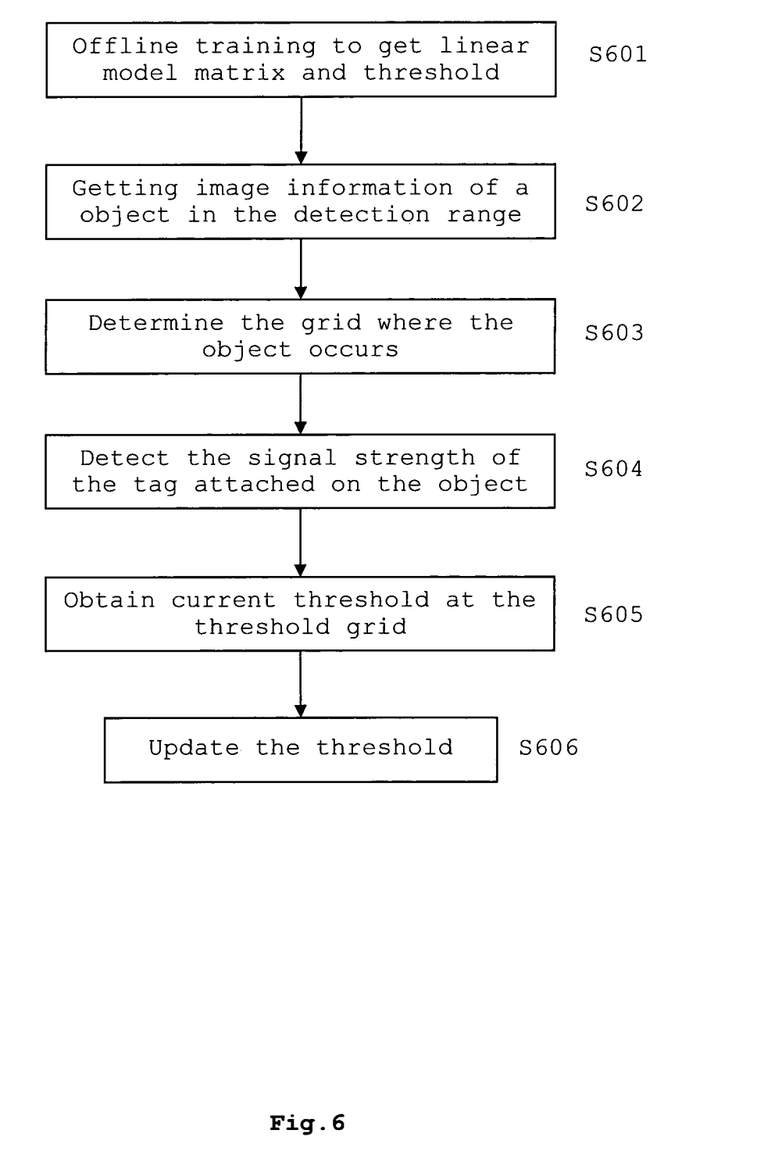
FIG. 6 is a flow chart showing a method for object tracking and recognition according to the embodiment of the invention.

FIG. 6 is a flow chart showing a method for object recognition according to the embodiment of the invention. At step 601, the offline training is carried out to get the linear model matrix shown in FIG. 3 and the original threshold signal strength at the threshold grids DR1-DR3. Then at step 602, when an object occurs in the detection range, the camera is turned on to get the image information of the object, and at step 603, the grid where the object occur is determined by the camera according to the image information. At this time, the RF device is also available to detect the signal strength of the RF tag attached on the object at step 604. According to the linear model matrix, the current signal strength threshold at the threshold grids can be obtained at step 605 to update the original threshold at step 606.

The foregoing merely illustrates the embodiment of the invention and it will thus be appreciated that those skilled in the art will be able to devise numerous alternative arrangements which, although not explicitly described herein, embody the principles of the invention and are within its spirit and scope.

The invention claimed is:

1. An object tracking and recognition system comprising:
   a coordinate and image model for obtaining coordinates and image information for a detection range;
   a RFID device for detecting the strength of a RF signal transmitted by an object entering the detection range;
   a video device controlled to turn on and obtain image information of the object in response to the strength of the RF signal detected by the RFID device reaching a threshold indicating the object is within the detection range and within a distance from the video device;
   an information generator for receiving the coordinates from the coordinate and image model and mapping a location of the object to identify a position of the object within the detection range;
   a coordinate generator for receiving the coordinates from the coordinate and image model to detect the distance of the object to the video device; and
   a processor for updating the threshold as a function of a relationship model of strength values of the RF signal of at least two locations in the detection range of the video device, wherein the relationship model is a linear matrix model of signal strength between the regions in the detection range and the threshold is updated by a single or multiple point estimation method based on the relationship model.

2. The object tracking and recognition system according to claim 1, wherein the threshold corresponds to a distance from the object to the RFID device.

3. The object tracking and recognition system according to claim 1, further comprising an image coordinate or image model for providing a coordinate model or image model to the video device and RFID device.

4. The object tracking and recognition system according to claim 1, wherein the object tracking and recognition system is adapted to be arranged on an electronic device to turn the electronic device one of on and off based upon image information detected by the video device and the RFID device.

5. A method used in an object tracking and recognition system comprising:
   obtaining coordinates and image information for a detection range of the object tracking and recognition system and image information of an object entering the detection range;
   mapping a location of the object to identify a position of the object within the detection range based on the obtained coordinates;
   detecting a distance of the object to the video device based on the obtained coordinates;
   detecting, by a RFID device, signal strength of a RF tag of the object;
   turning on a video device to obtain the image information of the object upon the detected signal strength of the signal detected by the RFID device reaching a signal strength threshold indicating the object is within the detection range; and
   updating the signal strength threshold for subsequent use in turning on the video device as a function of a relationship model of values of the strength of the RF tag of at least two locations in the detection range of the video device, wherein the relationship model is a linear matrix model of signal strength between the regions in the detection range and the threshold is updated by a single or multiple point estimation method based on the relationship model.

6. The method according to claim 5, wherein the threshold corresponds to a distance from the object to the RFID device.

7. The method according to claim 5, further comprising providing a coordinate model or image model to the video device and RFID device.

8. The method according to claim 5, wherein the object tracking and recognition system is adapted to be arranged on an electronic device and turns the electronic device one of on and off based upon image information detected by the video device and the RFID device.

* * * * *